Jan. 12, 1954  R. E. GRILL  2,665,862
TIP TANK WEDGE SUPPORT

Filed Aug. 3, 1948  4 Sheets-Sheet 1

INVENTOR.
Raymond E. Grill
BY
Herbert E. Metcalf
ATTORNEY

Jan. 12, 1954  R. E. GRILL  2,665,862
TIP TANK WEDGE SUPPORT
Filed Aug. 3, 1948  4 Sheets-Sheet 4

INVENTOR.
Raymond E. Grill
BY
Herbert E. Metcalf
ATTORNEY

Patented Jan. 12, 1954

2,665,862

UNITED STATES PATENT OFFICE 2,665,862

TIP TANK WEDGE SUPPORT

Raymond E. Grill, Long Beach, Calif., assignor to Northrop Aircraft, Inc., Hawthorne, Calif., a corporation of California Application August 3, 1948, Serial No. 42,299

12 Claims. (Cl. 244—135)

This invention relates to airplanes, and, more particularly, to a means for supporting large wing tip fuel tanks which are jettisonable in flight.

Modern high speed airplanes, particularly those propelled by gaseous combustion turbines, are faced with a serious fuel storage problem. The fuel consumption of jet engines, for example, is high, and for high speeds the wing sections are thin, preventing the installation of large fuel tanks therein. In consequence, auxiliary fuel tanks have been resorted to, mounted outside of the aircraft, usually at or near the wing tips, and attached to the airframe by a fitting that can be disconnected at the will of the pilot to permit separation of the tank from the airplane. In use, the fuel from such tanks is customarily consumed first, the auxiliary tanks dropped, the airplane engines then being operated on internally stored fuel.

At first such auxiliary tanks contained only 100 to 300 gallons of fuel. As the demand for longer ranges increased, such tanks have been increased in size to hold as much as 625 gallons of fuel, which, in a tank weighing 450 pounds, will give a total weight of tank and fuel of about 4,570 pounds, i. e., over two tons.

Such tanks, if suspended beneath the wing tips, destroy a substantial amount of lift otherwise provided by the tip section. In consequence, some tip tanks at present are mounted straight out from the wing tip, with their attachment fittings installed in the tank side instead of at the top. Because of their weight, these tanks impose large bending loads on the attachment fittings.

These loads are highly important. In the design of fittings and supports which hold the tank to the end of the wing tip, it is necessary that these fittings be not only sufficiently strong to carry the loads, but also the fittings must be designed to readily release to jettison the tank even when full of fuel. When such a full-cantilever tip tank is released, there must be a minimum of friction from the fitting as the tank slides away from the wing tip, in order that the tank may not fail to release when a disconnect action is initiated by the airplane pilot.

It is an object of the present invention to provide in airplanes a means and method of support for full-cantilever mounted wing tip tanks, which support will carry a high percentage of the tank loads imposed on the wing tip, leaving only a relatively small unidirectional tensile load to be carried by the tank release fittings, and which will present a minimum of friction with the tank when the tank is released.

In broad terms, the present invention comprises wedge-shaped members mounted with their supporting surfaces flush with the wing tip skin of an airplane, these support wedges pointing outboard and mating with wedge receiving members attached to the structure of the tank.

In one form of the invention, the entire tank structure is circular in cross-section except that a cutout is formed in the inboard side, this cutout fitting around the wing tip and containing the wedge receiving members. In another form, the wing tip does not enter the main tank body, but the wedge receiving members formed in the tank structure are extended outside of the circular tank body. In either of the above forms, tank release fittings are located just within the wing tip and hook into attachment fittings which project inboard along a diameter of the tank. The tank is preferably placed so that the wing tip intersects it approximately on its horizontal center line plane.

Other objects and features of advantage, together with the foregoing, will be set forth in the following description of specific apparatus embodying this novel method. It is, therefore, to be understood that this method is applicable to other apparatus, and that the present invention is not limited in any way to the apparatus of the present application, as various forms may be adopted within the scope of the appended claims.

The invention may best be understood by reference to the accompanying drawings, wherein.

Figure 1:
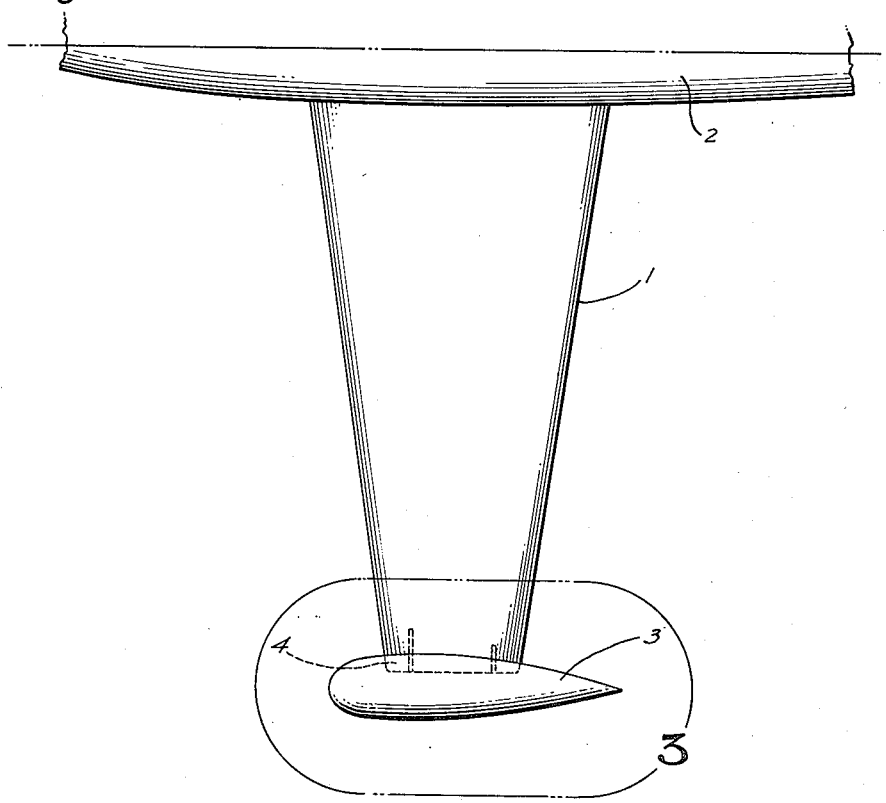
Figure 1 is a diagrammatic plan view of an airplane equipped with wing tip fuel tanks of the present invention.
Figure 2:
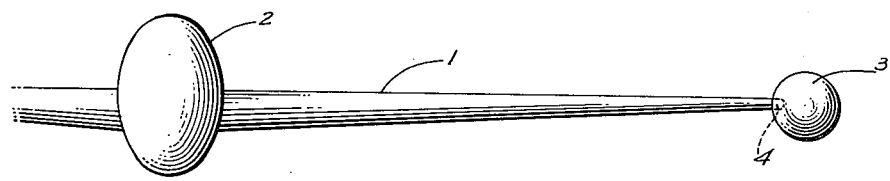
Figure 2 is a diagrammatic front view of the airplane and wing tip tank shown in Figure 1.

Referring first to Figures 1 and 2, an airplane wing 1 extends on each side of a fuselage, indicated by line 2, to terminate in a wing tip fuel tank 3 which is cut away on the inboard side to receive the wing tip 4.

Figure 3:
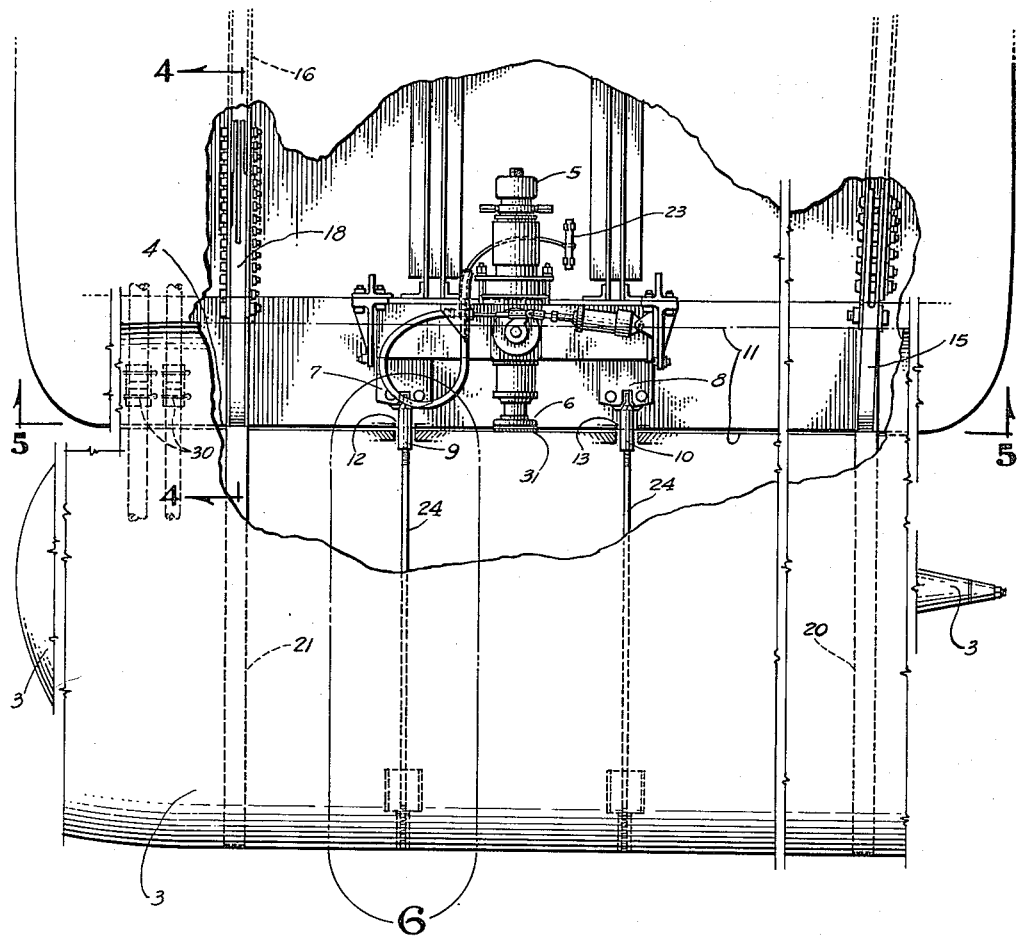
Figure 3 is a cut-away top view of an enlarged portion of the area indicated by broken line 3 in Figure 1, showing the wing tip, tank and attachment equipment.

As shown in Figure 3, a tank ejector 5 is positioned laterally in the wing tip 4 with its piston foot 6 flush with the vertical face of the wing tip. A modified bomb ejector, for example, may be used for this purpose. This type ejector has two release hooks 7 and 8 which engage two attachment lugs 9 and 10 mounted laterally in the tank cut-out 11. These lugs fit through lug holes 12 and 13 in the wing tip end to where the release hooks 7 and 8 are located just within the wing tip structure. The ejector 5 with its hooks 7 and 8 holds the tank 3 to the wing tip 4 until the jettison operation is performed, at which time the hooks release the attachment lugs 9 and 10, and the piston foot 6 then forces the tank 3 free of the wing tip 4.

Figure 4:
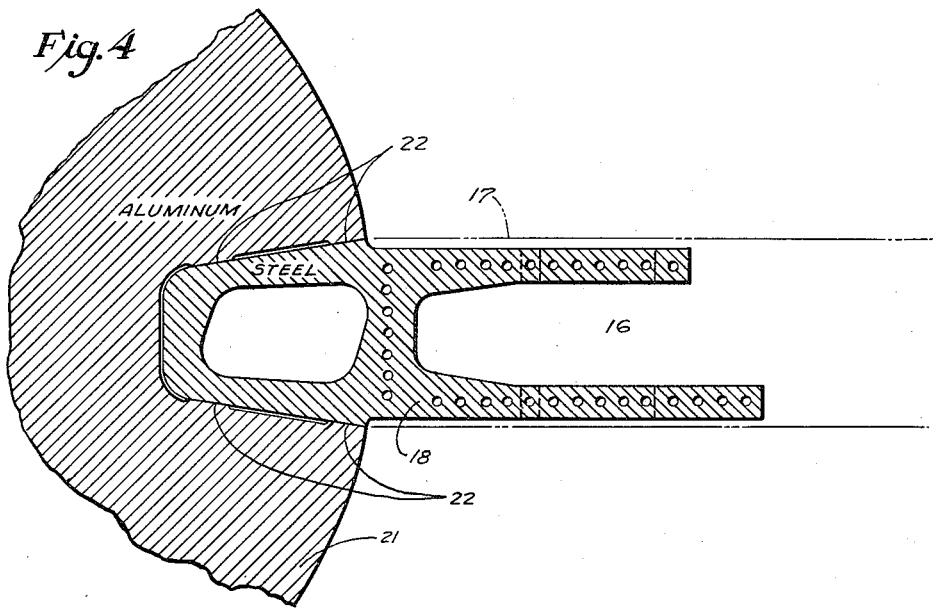
Figure 4 is a sectional view showing the wing tip tank support structure of the present invention, taken as indicated by the line 4—4 of Figure 3 and rotated 90 degrees clockwise.
Figure 5:
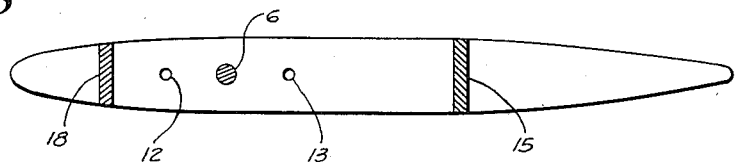
Figure 5 is a schematic end view of the wing tip with tank removed, showing two flush-mounted support wedges for the tip tank, and the location of a tank ejector.

The main support of the wing tip tank 3, however, and that which takes the bending moment loads, is provided by means other than the release hooks, as shown in Figure 4. Here, a support wedge 18 is fixed to a main wing spar 16. The wedge 18 is mounted in a vertical plane, and near the outboard end its sides extend outwardly so that its upper, lower, and end surfaces lie flush with the outer wing skin 17, which is cut away adjacent to these surfaces to expose the wedge 18. The wedge is made of a hard material, such as type 414 corrosion-resistant steel heat treated to 200,000 p. s. i., for example. This is preferable to a plated material, since the latter would be subject to a galling action which would expose the inner metal to rusting. A second wedge 15 is similarly attached to another wing spar. The wing tip end thus appears as shown schematically in Figure 5.

The wing tip fuel tank 3 contains two main bulkheads 20 and 21 which divide the tank into three sections. The tank is so designed that these bulkheads will coincide with the two wedge positions, and the inboard side of each bulkhead is cut out to mate with its respective wedge, as shown in Figure 4. For more accurate positioning and determining of stresses, the wedge mating surface of each bulkhead is preferably machined to contact the wedge at four pads 22, two on the upper side of the wedge 18 and two on the lower. Since the tank 3 is considered an expendable item, these bulkheads 20 and 21 may be made of aluminum alloy, permitting the majority of wear to occur on them rather than on the support wedges 15 and 18, which can, therefore, remain permanently installed without significant rework.

The upper and lower wedge surfaces form an included angle of approximately 18 degrees The larger this angle becomes, the more readily the wing tip tank will fall when released, and the greater will be the tensile load on the release hooks 7 and 8 in the wing. Throughout the range of wedge angles between the minimum angle which will permit the tank to fall when released with no push from an ejector, and the maximum angle at which the release fittings can safely carry the tensile load, the load reactions at the wedge contact pads 22 do not vary materially. Therefore the wedge angle of 18 degrees in the present instance was chosen primarily in accordance with the capacity of the release hooks. However, when stronger wing fittings are employed, this wedge angle may be made greater to reduce or eliminate the need for ejector means. Therefore, this invention is not deemed to be limited to the particular wedge angle used in the present apparatus.

Figure 6:
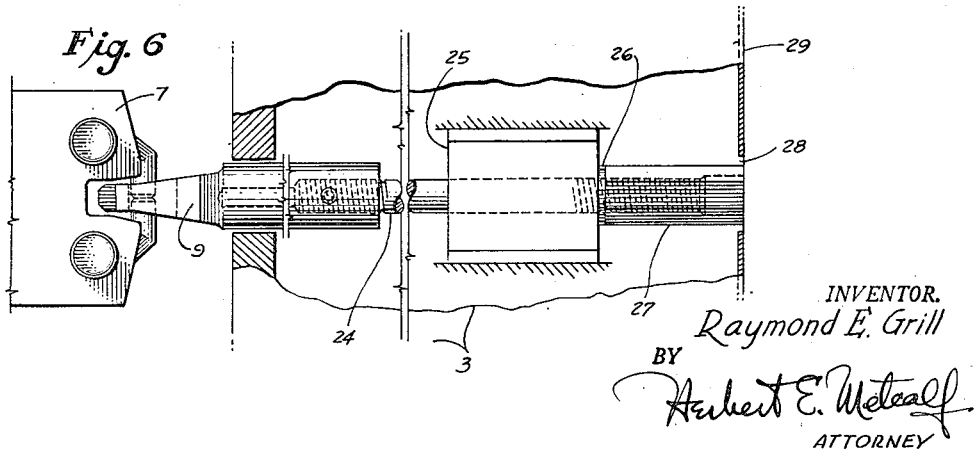
Figure 6 is a cut-away top view of an enlarged portion of the area indicated by broken line 6 in Figure 3, showing a tank release hook and adjustment means for properly securing the tip tank over its wedge supports.

The ejector release hooks 7 and 8 may be opened manually by a cable handle 23 at the wing tip. After the tank 3 is pushed into place, automatically closing the hooks through the attachment lugs 9 and 10, adjustments are made to obtain the desired fit of the tank bulkheads 20 and 21 on the wedges 15 and 18, as shown in Figure 6. Each attachment lug 9 and 10 is fastened to an attachment rod 24 which extends through the tip tank 3 to the outboard side. The rod 24 passes through a fixed block 25 and is provided with a washer 26 and hexagonal nut 27 which bear on the block 25 and are accessible through a hole 28 in the tank skin 29. The lugs 9 and the nuts 27 are sealed by suitable packing means (not shown) to the tank wall structure to retain fuel in the tank. After installation of the tank 3, the nut 27 is tightened to a predetermined torque value. This draws the tank inwardly to a rigid position, with the bulkheads 20 and 21 fitting snugly over the support wedges 15 and 18.

Fuel and air line connections 30 (Figure 3) are made by means of hoses and hose clamps accessible through an access door in the wing tip forward portion. These connections are readily separable when the tank is ejected. A wing tip light may be mounted on the outboard side of the tank, its wiring having disconnectable terminals located in the tank cut-out.

The edges of the tank cut-out 11 are shaped to fit the wing airfoil section at the inboard side of the tank 3 and a sealing strip (not shown) is provided on the tank to close this juncture.

The interior of the tank cut-out 11 opposite the ejector piston foot 6, previously mentioned, is provided with a boss 31 to receive the thrust of the ejector, which may be on the order of 15,000 pounds. This boss 31 is regulated in thickness by shimming to provide a clearance of about $\frac{1}{16}$ inch to $\frac{1}{8}$ inch between the piston foot 6 and boss 31.

Figure 7:
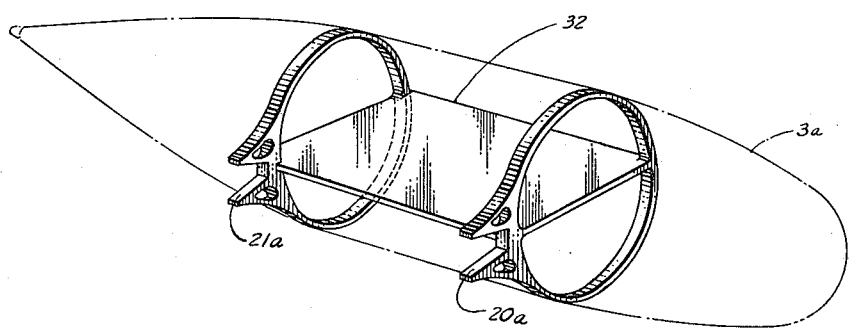
Figure 7 is perspective structural view of a wing tip fuel tank embodying another form of the present invention.
Figure 8:
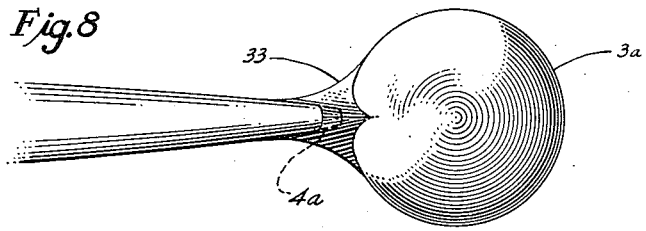
Figure 8 is a diagrammatic front view of a wing tip tank in Figure 7, showing its placement at the end of a wing tip.

Another embodiment of the present invention is shown in Figures 7 and 8. The wedges in the wing remain substantially unchanged, but the tank 3a is modified to reduce weight and cost by retaining its circular fuel cell cross-section for the entire length of the tank. Rather than having a cut-out in the tank side, as before, structural rings 20a and 21a replace the former bulkheads and are here extended in the inboard direction to form the mating surfaces for the wedges, and the wing tip 4a merely extends out to the side of the tank proper 3a. Forgings or castings are used for these structural rings and a horizontal web 32 is provided connecting their centers. In this embodiment a fairing 33 is installed between the rings 20a and 21a, at the top and bottom, and also fore-and-aft of the rings intersecting the tank body 3a to present a continuously smooth exterior surface.

Thus, it is clearly seen from the foregoing that the wing-mounted wedges will carry substantially all the bending loads into which the vertical force of the tip tank's weight is converted, and the release fittings take only a pure tensile load. Therefore, these fittings will easily release their hold on the tank regardless of amount of fuel remaining or position of airplane, and the tank will be separated from the airplane with a minimum of friction when the ejector is fired, because of the slanting surfaces of the support wedges.

It is also to be noted that the present invention is suitable for carrying devices, other than fuel tanks, which are to be released from a wing tip, and that the angle of wedge center line to wing plane can be varied to any desirable degree.

What is claimed is:

1. In an airplane, means for releasably supporting a mass in a centered position outwardly from a normally horizontal wing tip of said airplane, which comprises first support means permanently fixed within said wing tip and having exterior mass-contacting surfaces lying flush with the outer face of the skin of said wing tip, second support means permanently fixed to said mass and mating with said first support means in contact with said surfaces, both said support means being positioned to carry substantially all of the vertical bending and compression loads imposed by said mass on said wing tip, a tension element connected at its inner end to said wing tip, said tension element arranged to extend horizontally through said mass, and adjustable fastening means carried by the outer end of said tension element.

2. In an airplane, a pair of vertical load bearing members in the tip of the wing of said airplane and spaced longitudinally of said airplane, each having an exterior surface flush with the outer face of the skin of said wing tip, said surface including straight portions of the top, end and bottom contour of said wing tip, the top and bottom portions of each said surface converging toward the end portions to form wedge shaped members positioned to fit into wedge receiving members of a fuel tank, said load bearing members being permanently attached to the main load bearing frame members of said wing, and tension means attached in said wing tip for receiving and connecting with a portion of a wing tip tank when the tank is supported by said load bearing members in said wing.

3. Apparatus in accordance with claim 2, wherein the upper and lower portions of said surfaces converge toward the end portions of said surfaces at an included angle of about 18 degrees.

4. In an airplane having a wing, the combination of a pair of vertically disposed support members permanently fixed within the tip of said wing to two wing frame members spaced longitudinally of said airplane, said support members being wedge shaped about the chord plane of said wing with substantially straight exterior upper and lower surface converging toward a point outwardly from said wing tip, said exterior surfaces being flush with the normal upper and lower skin line of said wing tip, a fuel tank, wedge receiving members attached to said tank and mating with said support members, and a tension element extending from said tip to said tank to hold said support and receiving members in mating contact, said tension element being releasably attached to said tip.

5. In an airplane having a wing, the combination of a pair of vertically disposed support members permanently fixed within the tip of said wing to two wing frame members spaced longitudinally of said airplane, said support members being wedge shaped about the chord plane of said wing with substantially straight exterior upper and lower surfaces converging toward a point outwardly from said wing tip, said exterior surfaces being flush with the normal upper and lower skin line of said wing tip, a fuel tank, wedge receiving members attached to said tank and mating with said support members, a tension element extending from said tip to said tank to hold said support and receiving members in mating contact, said tension element being releasably attached to said tip, and means positioned on said tip between said wedges movable to force said tank outwardly from said tip after said tension element has been released, said latter means having a flat ejector end normally positioned to rest flush with the end contour of said wing tip.

6. Apparatus in accordance with claim 4, wherein the upper and lower wedge surfaces converge at an included angle of about 18 degrees.

7. Apparatus in accordance with claim 4, wherein said tension element passes through said tank, and wherein means are provided to change the tension on said element from outside said tank after said tank and tip have been assembled.

8. Apparatus in accordance with claim 4, wherein said tension element passes through said tank, and including access means in the outer side of said tank opposite said tension element, and adjustable tension means on the outer end of said tension element positioned in cooperating relationship with said access means.

9. Apparatus in accordance with claim 2 wherein said tension means comprises a rod releasably attached at its inner end to said wing tip, said rod adapted to extend through a wing tip tank, and adjustable fastening means carried at the outer end of said rod.

10. Apparatus in accordance with claim 4 wherein said tension element comprises a rod passing through said tank, said rod having a threaded outer end, a bracket member fixed to said tank and surrounding said rod at said outer end, an adjustable fastening element threaded on said rod outer end and bearing against the outer side of said bracket member, and means defining an opening in the outer side of said tank, said fastening element positioned substantially flush with said opening.

11. In an airplane having a wing-like structure, the combination of a pair of vertically disposed support members fixed within the tip of said structure to two frame members spaced longitudinally of said airplane, said support members being wedge shaped about the chord plane of said structure with substantially straight exterior upper and lower surfaces converging toward a point outwardly from said tip, said exterior surfaces forming a part of the outer contour of said tip, a fuel tank, a pair of substantially annular structural rings in said tank, said structural rings having integral wedge receiving portions extending outwardly therefrom and mating with said support members, and a tension element extending from said tip to said tank to hold said support members and receiving portions in mating contact, said tension element being releasably connected to said tip.

12. A wing tip fuel tank having a pair of vertical substantially annular structural rings fixed therein, said structural rings having integral wedge receiving portions extending radially outwardly therefrom and external of said tank for fitting over a pair of wedge shaped support members.

RAYMOND E. GRILL.

References Cited in the file of this patent

UNITED STATES PATENTS

| Number | Name | Date |
|---|---|---|
| 2,416,104 | Lerche | Feb. 18, 1947 |
| 2,421,699 | Johnson | June 3, 1947 |
| 2,466,980 | Bronson | Apr. 12, 1949 |
| 2,505,604 | Clark et al. | Apr. 25, 1950 |
| 2,549,785 | Douglass | Apr. 24, 1951 |

FOREIGN PATENTS

| Number | Country | Date |
|---|---|---|
| 609,456 | Great Britain | Sept. 30, 1948 |